United States Patent [19]

Prell et al.

[11] Patent Number: 4,833,830
[45] Date of Patent: May 30, 1989

[54] HATCH CLOSURE ASSEMBLY

[75] Inventors: Edward T. Prell, Sausalito; Stephen M. Jacobs, Cupertino, both of Calif.

[73] Assignee: Schlage Lock Company, San Francisco, Calif.

[21] Appl. No.: 127,235

[22] Filed: Dec. 1, 1987

[51] Int. Cl.⁴ .............................................. E06B 3/32
[52] U.S. Cl. ....................................... 49/463; 49/506
[58] Field of Search ............... 49/463, 465, 466, 506; 411/403

[56] References Cited

U.S. PATENT DOCUMENTS

| 11,227 | 7/1854 | Ingalls | 49/463 |
| 1,323,790 | 12/1919 | Schwab | 49/463 |
| 2,114,499 | 4/1938 | Maclear | 49/465 |
| 4,143,733 | 3/1979 | Morello et al. | 49/463 X |
| 4,211,128 | 7/1980 | Plumer | 411/403 X |
| 4,242,932 | 1/1981 | Barmore | 411/403 X |

Primary Examiner—Philip C. Kannan
Attorney, Agent, or Firm—Arthur N. Trausch, III

[57] ABSTRACT

A hatch closure assembly having high security includes a hatch locking spring and lever which is actuated by an adjustable screw. The actuating screw can be turned only by a special wrench.

5 Claims, 2 Drawing Sheets

HATCH CLOSURE ASSEMBLY

BACKGROUND OF THE INVENTION

The present invention relates to a hatch closure assembly and, in particular, to a hatch assembly which provides a high degree of security.

There are many mechanical and electrical devices that are contained in exterior mounted housings that require access for repairs or maintenance. However in certain situations, these same devices must be highly secured from intruders. The housing for an electronic lock is one example. The housing must provide easy interior access for repairs or maintenance such as replacing battery packs. Alternatively, access must be secure so that an intruder can't disable or by-pass the lock. Thus many hatch assemblies have the dichotomy of requiring easy access for authorized personnel but restricted access for intruders.

SUMMARY OF THE INVENTION

It is therefore a primary object of the present invention to provide a hatch assembly having easy interior access for certain authorized personnel and high security from unauthorized intruders.

It is another object of the present invention to provide a simple, reliable, low cost hatch assembly having a high degree of security.

In general, the foregoing objects are attained in a hatch assembly having a spring attached to the hatch, a pivotable lever on the housing for securing the hatch spring and an actuating screw having a special drive head and requiring a precise wrench for rotating the screw.

BRIEF DESCRIPTION OF THE DRAWINGS

FIG. 5 is an enlarged side view of the hatch in the opening position.

DETAILED DESCRIPTION OF THE INVENTION

Figure 1:
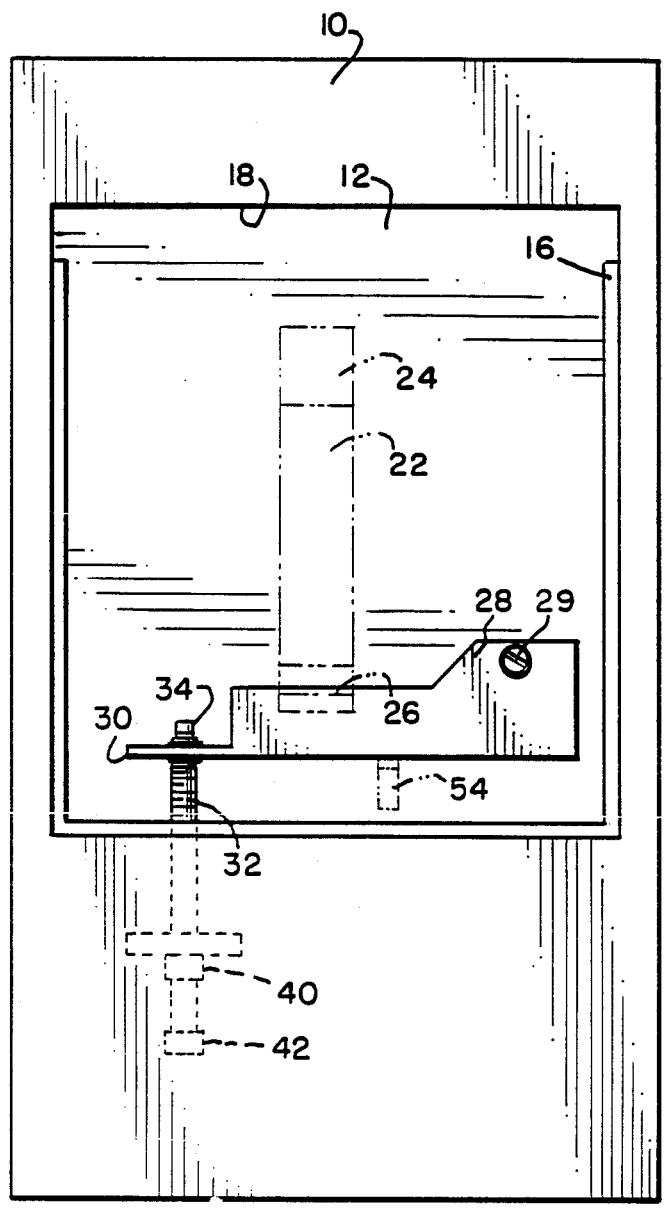
FIG. 1 is a partial plan view of a housing showing the hatch closure assembly of the present invention, shown with the hatch removed.
Figure 2:
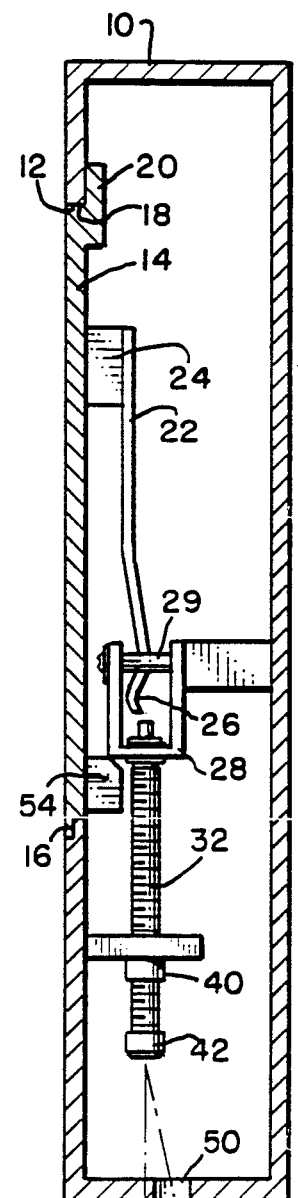
FIG. 2 is a side view of the housing of FIG. 1.

Referring now to the drawings, wherein like reference numerals designate identical or corresponding parts throughout the several views, and more particularly to FIGS. 1 and 2, a preferred embodiment of a hatch assembly incorporating the invention will now be described. Access to the interior of certain housings 10, such as an electronic lock housing, must be highly securable to prevent access by intruders, yet must be readily available to provide access for maintenance or repairs. Thus an access opening 12 is typically provided on the front of the housing. A cover or hatch 14 (see FIG. 2) is usually provided to close the opening. The hatch seats on flanges that protrude into the opening but are recessed from the surface of the housing. At least two seating flanges 16 are provided on the housing access opening. One edge 18 of the opening in the housing is flangeless. The hatch also has a single inwardly recessed flange 20 on one edge that is insertable behind the flangeless edge of the opening. The hatch 14 is dimensioned so that it fits flush in the opening when closed.

A mechanism for securing one other edge of the hatch will now be described. A substantially flat cantilevered leaf spring 22 is attached to the hatch. The spring is anchored on one end by a raised boss 24 that holds it parallel to the back surface of the hatch. The spring has a V-shaped catch 26 at the cantilever end.

The second member of the securing device is a lever 28 pivotally attached to the housing. The lever pivots about a pin 29 that permits the free end of the lever to rotate through a small arc. The lever as shown is a U-shaped member whose sides are tapered from the pivoted end to a smaller dimension at the free end. The free end of the lever has a substantially flat extension 30 for engaging the lever actuating device. The catch 26 of spring 22 is captured by the lever between the pivot 29 and the end extension 30.

Figure 3:
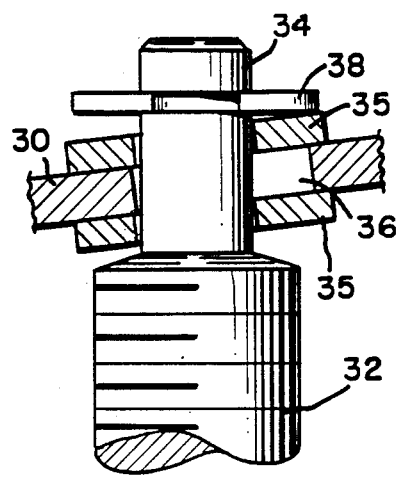
FIG. 3 is an enlarged view of the screw end tip.

To get the lever to pivot into engagement with the spring on the hatch, an actuating device that is readily accessible and usable by maintenance personnel, but difficult to use by intruders, is needed. As shown in the drawing an adjustable, partially threaded actuating screw 32 is utilized to move the lever. The actuating screw has an unthreaded end tip 34 that engages the extending end 30 of the lever. As shown in FIG. 3, the end tip is a smaller diameter than the threaded portion of the screw. A hole 36 is provided on the extended end 30 of the lever to accept the end tip. The hole is oval shaped to accommodate the rotary arc movement or tilting of the lever relative to the actuating screw. Washers 35 may be provided on the end tip. An E-ring retainer 38 or other means is used to prevent the screw tip 34 from disengaging from the end of the lever. The actuating screw is threaded through a drive nut 40 that is held by the housing. As the screw advances through the drive nut it moves the end of the lever upward about the lever pivot point. The end of the screw threaded portion acts as an end stop to prevent over tightening of the lever. A drive head 42 is provided on the end of the actuating screw.

Figure 4:
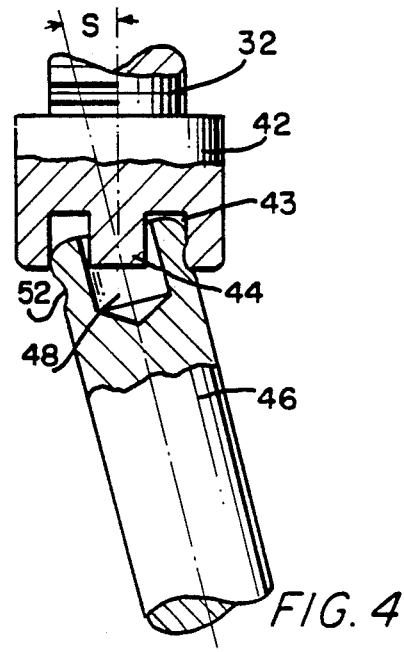
FIG. 4 an enlarged sectional view of a screw drive head and wrench according to the invention.

To make tampering difficult, the drive head 42 of the actuating screw has a hexagonal Allen-type socket 43 with a center pin projection 44 (see FIG. 4). This prevents a standard Allen wrench from being used to rotate the actuating screw. A special wrench 46 with a hole 48 in the hexagonal tip is required to seat in the screw drive head socket.

Additionally, the tool access hole 50 through the housing for the wrench is off-axis from the rotational axis of the screw. That is, the line from the access hole to the drive head is skewed or off-axis from the rotational axis of the screw. The skew is typically a small angle S, in the range of 3 to 10 degrees. However, the skew requires that the wrench have a ball-type end 52 in order to register in the screw drive head. Thus a special wrench with both of the previously described modifications is required to turn the actuating screw. The off axis alignment "S" of the access hole and the actuating screw rotational axis plus the center pin projection 44 requires an intruder to have a precisely modified Allen wrench to gain access to the housing.

To facilitate opening, a disengaging rib 54 is provided on the hatch to push the hatch away from the housing. As the actuating screw is unscrewed from the drive nut, the lever 28 is pulled downward and the rib rides up on the lever. This motion pushes the bottom of the hatch 14 outward away from the housing flanges. The hatch can then be rotated about the flangeless edge 18 of the opening to provide access to the interior of the housing.

Figure 5:
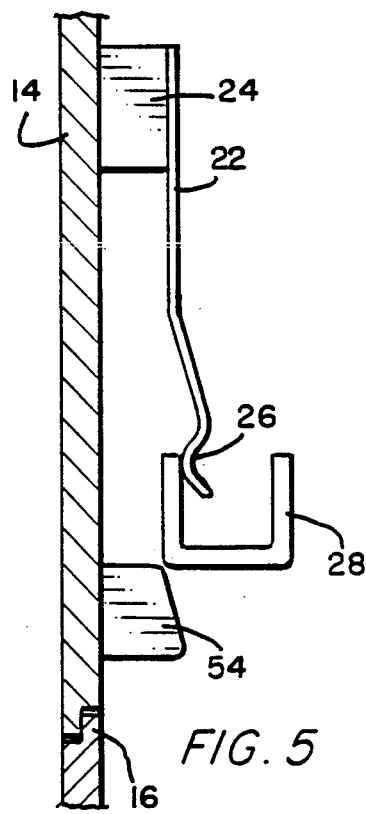
FIG. 5 is an enlarged side view of the hatch in the fully closed position.

The steps involved in securing and opening the hatch will now be described. First, to secure the hatch the flanged edge 20 of the hatch is engaged behind the flangeless edge 18 of the access opening 12 in the housing. The hatch is then pivoted into a closed position over the opening so that both the exterior surfaces of the hatch and housing are flush. The special wrench 46 is inserted in the access hole 50 and is used to rotate the actuating screw upward through the drive nut. Initially the lever 28 is at a small angle less than horizontal. The upward movement of the end tip of the actuating screw causes the extended end 30 of the lever to move in an arc about the pivot point. As shown in FIG. 5, the U-shaped portion of the lever 28 pivots into engagement with the catch 26 of the spring 22 and the hatch is now securely held in position at a second edge.

Figure 6:
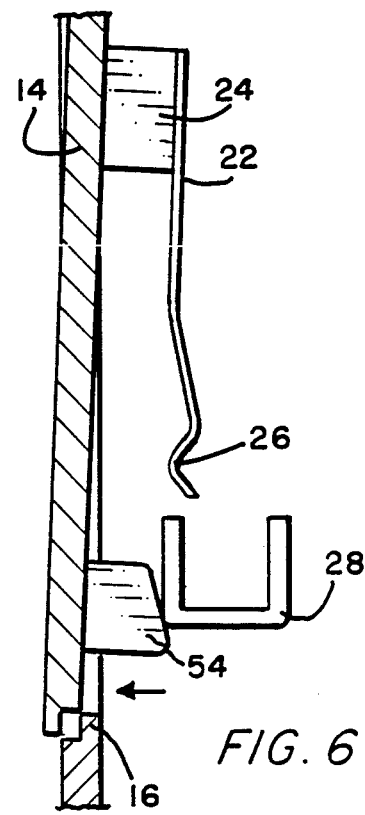

To disengage the hatch, the special wrench is inserted into the access hole 50 and the actuating screw 32 is rotated to back the screw out of the drive nut. This causes the tip of the actuating screw to pull down on the extended portion 30 of the lever. As shown in FIG. 6, after the lever 28 disengages from the catch 26 one side of the inclined portion of the rib 54 rides upon the lever and forces the hatch 14 outward so that the hatch can be rotated about its flanged end 20.

The advantages of the present invention is that it limits access to the internal space of a housing to those authorized people who have a special tool. When engaged, the stiff, compliant spring holds the hatch flush with the housing face. However, maintenance and repair personnel with the special tool can gain quick and easy access to the interior of the housing. The modified Allen wrench is simple but because of its precise tolerances is not readily fabricated or duplicated. The present invention also provides the advantage that on closing, the actuating screw cannot be overtightened because the screw has its own end stops. Additionally, upon opening, all the hatch assembly pieces remain connected so that service personnel aren't burdened with loose hardware that could be misplaced or require difficult reconstruction prior to closing.

Numerous modifications and variations of the present invention are possible in light of the above teachings. It is therefore to be understood that the invention may be practiced other than as specifically described herein and it is intended that the invention be limited only by the language of the following claims:

I claim:

1. A hatch assembly for a housing comprising:
    a hatch opening in said housing;
    a hatch member having a flange at one edge which is insertable behind the latch opening;
    means for securing another edge of said hatch member to said housing, said securing means including a cantilevered spring on said hatch member and pivotable lever on said housing engageable with said spring; and
    means for actuating said securing means.

2. The hatch assembly of claim 1 wherein said actuating means further comprises an adjustable screw threadably driveable to move said lever into engagement with said spring.

3. The hatch assembly of claim 2 wherein said adjustable screw further comprises an Allen-type drive head having a center projecting pin.

4. The hatch assembly of claim 3 wherein said hatch assembly further includes an access hole in said housing for applying rotation to said adjustable screw wherein the line between the access hole and the drive head is skewed by a predetermined angle from the rotational axis of the screw.

5. A method for securing a hatch in an opening of a housing comprising the steps of:
    engaging a flanged edge of the hatch behind the opening of the housing;
    pivoting the hatch into a closed position over the opening;
    rotating an adjustable screw to drive a lever about a pivot point on the housing; and
    pivoting the lever into engagement with a leaf spring on the hatch.

* * * * *